United States Patent
Wilton et al.

(10) Patent No.: US 10,323,698 B2
(45) Date of Patent: Jun. 18, 2019

(54) TORQUE TRANSFERRING CLUTCH SEPARATION

(71) Applicant: GM Global Technology Operations LLC, Detroit, MI (US)

(72) Inventors: Daryl A. Wilton, Macomb, MI (US); James M. Hart, Belleville, MI (US); Ted R. Skrzycke, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 15/340,144

(22) Filed: Nov. 1, 2016

(65) Prior Publication Data

US 2018/0119752 A1    May 3, 2018

(51) Int. Cl.
| | |
|---|---|
| *F16H 45/02* | (2006.01) |
| *F16D 25/0638* | (2006.01) |
| *F16D 13/52* | (2006.01) |
| *F16D 13/58* | (2006.01) |
| *F16D 13/70* | (2006.01) |

(52) U.S. Cl.
CPC ......... *F16D 25/0638* (2013.01); *F16D 13/52* (2013.01); *F16D 13/58* (2013.01); *F16D 2013/706* (2013.01); *F16H 45/02* (2013.01); *F16H 2045/0284* (2013.01)

(58) Field of Classification Search
CPC ...... F16D 25/0638; F16D 13/52; F16D 13/58; F16D 2013/706; F16H 2045/0284; F16H 45/02
See application file for complete search history.

(56) References Cited

U.S. PATENT DOCUMENTS

| | | | | |
|---|---|---|---|---|
| 2,229,910 | A | * 1/1941 | Adamson | F16D 13/70 192/111.15 |
| 2,277,557 | A | * 3/1942 | Nutt | F16D 13/71 192/70.12 |
| 2,855,802 | A | 10/1958 | Gorsky | |
| 2,995,956 | A | 8/1961 | Moore | |
| 4,232,534 | A | * 11/1980 | Lamarche | F16D 43/18 192/214 |
| 4,252,226 | A | 2/1981 | Staub | |

(Continued)

FOREIGN PATENT DOCUMENTS

| | | |
|---|---|---|
| DE | 3139658 A1 | 4/1983 |
| DE | 3423210 A1 | 4/1985 |

(Continued)

*Primary Examiner* — David J Hlavka (57) ABSTRACT

A torque transferring transmission-drive system includes a first friction surface. A second friction surface is directed toward the first friction surface. A reaction plate is positioned between the first friction surface and the second friction surface. A piston is actuated by a fluid pressure to displace the first friction surface toward the second friction surface, frictionally engaging the reaction plate between the first friction surface and the second friction surface. At least one strap spring in a clutch engaged condition elastically compresses to allow the reaction plate to be frictionally engaged between the first friction surface and the second friction surface, and in a clutch disengaged condition the at least one strap spring elastically expands to create a clearance between the reaction plate and each of the first friction surface and the second friction surface.

18 Claims, 6 Drawing Sheets

(56) References Cited

U.S. PATENT DOCUMENTS

| | | | |
|---|---|---|---|
| 4,291,790 A | 9/1981 | Staub | |
| 4,398,436 A | 8/1983 | Fisher | |
| 4,413,711 A * | 11/1983 | Lamarche | F16F 15/12353 |
| | | | 192/213 |
| 4,430,064 A * | 2/1984 | Lamarche | F16H 45/02 |
| | | | 192/201 |
| 4,573,374 A | 3/1986 | Koshimo et al. | |
| 4,676,121 A | 6/1987 | Kouno | |
| 4,800,996 A | 1/1989 | Loizeau | |
| 5,070,974 A * | 12/1991 | Kirkwood | F16F 15/1215 |
| | | | 192/208 |
| 5,551,928 A | 9/1996 | Sudau | |
| 5,622,244 A * | 4/1997 | Hansen | F16D 35/00 |
| | | | 192/208 |
| 5,634,866 A | 6/1997 | Sudau | |
| 5,713,813 A | 2/1998 | von Greyerz | |
| 5,716,300 A | 2/1998 | Sammataro et al. | |
| 5,733,218 A | 3/1998 | Sudau et al. | |
| 5,735,768 A | 4/1998 | Sudau | |
| 5,766,109 A | 6/1998 | Sudau | |
| 5,816,973 A | 10/1998 | Sudau et al. | |
| 5,836,217 A | 11/1998 | Sudau et al. | |
| 5,863,274 A | 1/1999 | Jackel | |
| 5,878,856 A | 3/1999 | Sudau et al. | |
| 5,967,283 A * | 10/1999 | Kemper | F16D 13/583 |
| | | | 192/109 A |
| 5,967,939 A | 10/1999 | Reik et al. | |
| 5,976,048 A | 11/1999 | Sudau et al. | |
| 6,003,650 A | 12/1999 | Kleifges | |
| 6,019,663 A | 2/2000 | Sudau | |
| 6,058,801 A | 5/2000 | Schierling et al. | |
| 6,058,802 A | 5/2000 | Sudau et al. | |
| 6,099,434 A | 8/2000 | Sasse et al. | |
| 6,102,174 A | 8/2000 | Sasse | |
| 6,126,568 A | 10/2000 | Sudau | |
| 6,200,222 B1 | 3/2001 | Sudau | |
| 6,230,862 B1 | 5/2001 | Reik et al. | |
| 6,231,472 B1 | 5/2001 | Sudau et al. | |
| 6,354,974 B1 | 3/2002 | Kozarekar | |
| 6,398,655 B1 | 6/2002 | Orlamunder et al. | |
| 6,435,998 B1 | 8/2002 | Sudau et al. | |
| 6,439,362 B2 | 8/2002 | Reik et al. | |
| 6,591,705 B1 | 7/2003 | Reik et al. | |
| 6,695,109 B2 | 2/2004 | Wack et al. | |
| 6,758,315 B2 | 7/2004 | Bauer et al. | |
| 6,799,665 B1 | 10/2004 | Sasse et al. | |
| 6,832,672 B2 | 12/2004 | Bauer et al. | |
| 6,887,180 B2 | 5/2005 | Pels et al. | |
| 6,948,602 B2 * | 9/2005 | Arhab | F16H 45/02 |
| | | | 192/3.29 |
| 6,962,533 B2 | 11/2005 | Zottmann et al. | |
| 7,073,646 B2 | 7/2006 | Sasse et al. | |
| 7,108,626 B2 | 9/2006 | Friedmann | |
| 7,114,585 B2 | 10/2006 | Man et al. | |
| 7,143,879 B2 | 12/2006 | Ackermann et al. | |
| 7,261,665 B2 | 8/2007 | Friedmann et al. | |
| 7,267,212 B2 | 9/2007 | Wack et al. | |
| 7,287,634 B2 | 10/2007 | Agner et al. | |
| 7,484,607 B2 | 2/2009 | Schneider et al. | |
| 7,523,817 B2 | 4/2009 | Forster | |
| 7,530,223 B2 | 5/2009 | Ender et al. | |
| 7,604,542 B2 | 10/2009 | Bach et al. | |
| 7,648,009 B2 | 1/2010 | Wack et al. | |
| 7,651,399 B2 | 1/2010 | Wack | |
| 7,662,043 B2 | 2/2010 | Schmid et al. | |
| 7,743,900 B2 | 6/2010 | Breier | |
| 7,993,204 B2 | 8/2011 | Dogel | |
| 8,075,410 B2 | 12/2011 | Carlson et al. | |
| 8,313,385 B2 | 11/2012 | Mundt et al. | |
| 9,322,463 B2 * | 4/2016 | Medellin | F16H 45/02 |
| 2005/0029067 A1 | 2/2005 | Arhab et al. | |
| 2010/0216555 A1 | 8/2010 | Le Moal | |
| 2011/0143843 A1 | 6/2011 | Yamamoto et al. | |
| 2013/0269475 A1 | 10/2013 | Le Moal | |
| 2014/0162834 A1 | 6/2014 | Dogel et al. | |

FOREIGN PATENT DOCUMENTS

| | | |
|---|---|---|
| DE | 3630398 A1 | 5/1987 |
| DE | 3612583 A1 | 10/1987 |
| DE | 3624496 A1 | 1/1988 |
| DE | 3624498 A1 | 1/1988 |
| DE | 3834284 A1 | 4/1990 |
| DE | 3926384 A1 | 2/1991 |
| DE | 3934798 A1 | 4/1991 |
| DE | 4121586 A1 | 1/1993 |
| DE | 4128868 A1 | 3/1993 |
| DE | 4333562 A1 | 4/1994 |
| DE | 4444196 A1 | 6/1995 |
| DE | 19514411 A1 | 11/1995 |
| EP | 0041708 A2 | 12/1981 |
| EP | 0086044 A1 | 8/1983 |
| EP | 0533426 A2 | 3/1993 |
| FR | 2782766 A1 | 3/2000 |
| GB | 2220464 A | 10/1990 |
| GB | 2285109 A | 6/1995 |
| GB | 2292596 A | 2/1996 |
| GB | 2320534 A | 6/1998 |
| JP | S602249 A | 1/1985 |
| WO | WO2006082455 A1 | 8/2006 |

* cited by examiner

TORQUE TRANSFERRING CLUTCH SEPARATION

FIELD

The present disclosure relates to torque transferring clutch designs used in automobile automatic transmissions.

BACKGROUND

The statements in this section merely provide background information related to the present disclosure and may or may not constitute prior art.

A multi-speed automatic transmission uses frictional clutches having friction surfaces for example as lock-up clutches to temporarily lock a torque converter to a transmission input shaft, and clutches and brakes to change gear ratios during transmission shifting operations for both forward and reverse gear drives. Known clutch assemblies provide friction surfaces on multiple friction plates that engage multiple reaction plates when hydraulic pressure is applied to the clutch assembly. Known clutch assemblies use spline connections to individually couple the reaction plates and the friction plates to transmission structure or to components of the transmission. The spline connections, however provide only limited horizontal displacement.

When the clutch assembly is not engaged by hydraulic pressure it is desirable to maintain clearance between the friction surfaces and the reaction plates to reduce friction induced heat, friction surface wear, and the associated degradation of fuel economy. The limited horizontal displacement allowed by spline connections may not allow sufficient clearance between these components to be maintained and therefore may often induce heat, friction, and degraded fuel economy.

Thus, while current automatic transmission clutch assemblies achieve their intended purpose, there is a need for a new and improved device and method for reducing or eliminating splined clutch assemblies thereby allowing greater horizontal movement and to improve clutch assembly design.

SUMMARY

According to several aspects, a torque transferring transmission-drive system includes a first friction plate having a first friction surface. A second friction plate has a second friction surface directed toward the first friction surface. A reaction plate is positioned between the first friction surface and the second friction surface. At least one strap spring in a clutch engaged condition elastically compresses allowing the reaction plate to be frictionally engaged between the first friction surface and the second friction surface, and in a clutch disengaged condition the at least one strap spring elastically expands creating a clearance between the reaction plate and each of the first friction surface and the second friction surface.

In another aspect of the present disclosure, the at least one strap spring is connected at a first end to the second friction plate and is connected at a second end to the first friction plate such that the at least one strap spring joins the first friction plate to the second friction plate.

In another aspect of the present disclosure, the second friction plate defines a double sided friction plate including a third friction surface directed oppositely with respect to the second friction surface.

In another aspect of the present disclosure, the third friction surface faces a transmission housing and contacts the transmission housing in the clutch engaged condition.

In another aspect of the present disclosure, at least one fastener connecting the reaction plate to transmission housing.

In another aspect of the present disclosure, the multiple strap springs are each connected at the first end to the second friction plate using fasteners.

In another aspect of the present disclosure, the strap springs are each connected at the first end to the second friction plate by a weld joint.

In another aspect of the present disclosure, the strap springs are each integrally connected at the first end to the second friction plate such that the strap springs define integral extensions of the second friction plate.

In another aspect of the present disclosure, in the clutch disengaged condition the strap springs include a stepped shape, stepping from the first end to the second end.

In another aspect of the present disclosure, the stepped shape includes a substantially planar first surface at the first end which is elevated above a substantially planar second surface at the opposite second end when the strap springs are uncompressed in the clutch disengaged condition.

In another aspect of the present disclosure, a difference in a height "H" between the first end and the second end is a predetermined value, and wherein the difference in the height "H" creates a predetermined clearance between the first friction surface, the second friction surface, and the reaction plate in the clutch disengaged condition.

In another aspect of the present disclosure, the at least one strap spring is connected to the reaction plate by at least one fastener.

In another aspect of the present disclosure, the at least one strap spring and the at least one fastener are coupled to a fixed backing plate such that the at least one strap spring and the reaction plate are displaceable toward or away from the backing plate.

In another aspect of the present disclosure, a torque transferring transmission-drive system comprises a first friction surface. A second friction surface is directed toward the first friction surface. A reaction plate is positioned between the first friction surface and the second friction surface. A piston is actuated by a fluid pressure to displace the first friction surface toward the second friction surface, frictionally engaging the reaction plate between the first friction surface and the second friction surface. At least one strap spring in a clutch engaged condition elastically compresses to allow the reaction plate to be frictionally engaged between the first friction surface and the second friction surface, and in a clutch disengaged condition the at least one strap spring elastically expands to create a clearance between the reaction plate and each of the first friction surface and the second friction surface.

In another aspect of the present disclosure, a first friction plate having the first friction surface fixed thereto, wherein the first friction plate defines the piston.

In another aspect of the present disclosure, the at least one strap spring is connected by a fastener to the reaction plate.

In another aspect of the present disclosure, a first friction plate has the first friction surface fixed thereto; and a second friction plate has the second friction surface fixed thereto.

In another aspect of the present disclosure, the at least one strap spring is connected by at least one fastener to both the first friction plate and the second friction plate.

In another aspect of the present disclosure, a backing plate is fixed to structure of a transmission; and a wave plate is positioned between the piston and the reaction plate and acting when contacted by the piston to displace the first friction surface, the reaction plate, and the second friction surface together toward the backing plate.

According to further aspects of the present disclosure, a torque transferring transmission-drive system includes a first friction plate having a first friction surface. A second friction plate has a second friction surface directed toward the first friction surface. A reaction plate is positioned between the first friction surface and the second friction surface. A piston is actuated by a fluid pressure to displace the first friction surface toward the second friction surface, frictionally engaging the reaction plate between the first friction surface and the second friction surface. Multiple strap springs are each connected either to both of the first and the second friction plates or to the reaction plate. In a clutch engaged condition the multiple strap springs elastically compress allowing the reaction plate to be frictionally engaged between the first friction surface and the second friction surface, and in a clutch disengaged condition the multiple strap springs elastically expand creating a clearance between the reaction plate and each of the first friction surface and the second friction surface.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
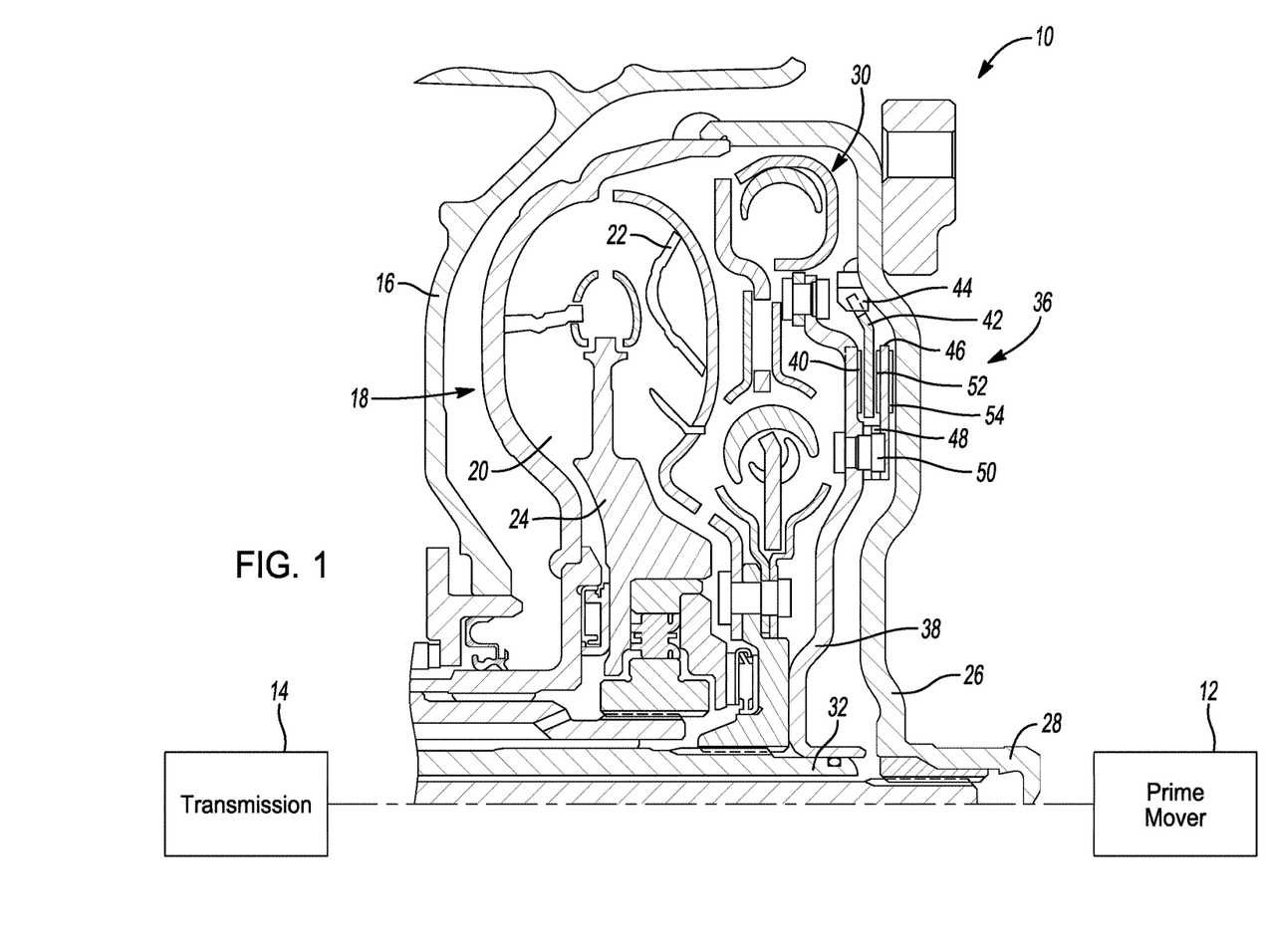
FIG. 1 is a cross sectional side elevational view of a torque transferring transmission drive system of the present disclosure.

With reference to FIG. 1, according to several aspects, a torque transferring transmission-drive system 10 for a motor vehicle transfers motive power from a prime mover 12 such as a motor or an internal combustion engine to a transmission 14 enclosed within a transmission housing 16. A torque converter 18 transfers rotational energy of the prime mover 12 and generally includes a pump 20, a turbine 22, and a stator 24 positioned within a torque converter housing 26. The pump 20 is coupled to the torque converter housing 26 and is driven by a prime mover drive component 28. The turbine 22 is fluidly driven by rotation of the pump 20. The stator 24 is located between the pump 20 and the turbine 22 and is used to multiply torque within the torque converter 18. A torsional vibration isolator 30 is used to isolate torque pulsations between the prime mover drive component 28, the torque converter 18, and a transmission input shaft 32.

The transmission 14 is releasably coupled to the torque converter housing 26 using a clutch assembly 36. The clutch assembly 36 includes a flexible first or single sided friction plate 38 also functioning as a piston which is attached to the transmission input shaft 32 through the torsional vibration isolator 30. The first or single sided friction plate 38 includes a first friction surface 40 facing a reaction plate 42 which is connected by a spline 44 to the torque converter housing 26. A second or double sided friction plate 46 is positioned between the reaction plate 42 and the torque converter housing 26. Multiple strap springs 48 and fasteners 50 such as rivets are used to connect the second or double sided friction plate 46 to the first or single sided friction plate 38. The double sided friction plate 46 includes a second friction surface 52 facing the reaction plate 42, and a third friction surface 54 facing the torque converter housing 26. Hydraulic pressure applied to the friction plate 38 causes deflection of the single sided friction plate 38 toward the reaction plate 42. This in turn causes the first friction surface 40 to frictionally contact the reaction plate 42, which deflects to contact the second friction surface 52. The double sided friction plate 46 is thereby deflected such that the third friction surface 54 contacts the torque converter housing 26.

In order to provide rotational clearance between the first friction surface 40 and the reaction plate 42, between the reaction plate 42 and the second friction surface 52, and between the third friction surface 54 and the torque converter housing 26 when the clutch assembly 36 is not engaged, the multiple strap springs 48 have a stepped shape or body geometry. By utilizing the multiple strap springs 48 the clutch assembly 36 provides the benefits of maximizing a total frictional surface area of the clutch assembly 36 while minimizing a lateral thickness of the clutch assembly 36, thus saving space and providing arrangement flexibility in the torque converter housing 26.

Referring to FIG. 2 and again to FIG. 1, according to several aspects an assembly 55 of the double sided friction plate 46 to the single sided friction plate 38 is provided using multiple strap springs, in this example having six strap springs 48a, 48b, 48c, 48c, 48e, 48f. Each of the strap springs 48a, 48b, 48c, 48c, 48e, 48f is individually fastened onto the single sided friction plate 38 using one of the fasteners 50 such as a rivet, and an opposite end of each of the strap springs 48a, 48b, 48c, 48c, 48e, 48f is individually fastened onto a separate wing extension 56 of the double sided friction plate 46 using a fastener 58 such as a rivet. In this aspect, each of the wing extensions 56 is directed inwardly from the double sided friction plate 46. Also in this aspect, each of the strap springs 48a, 48b, 48c, 48c, 48e, 48f is oriented in the same direction, such that each will be similarly loaded, either all in in tension or all in compression when the clutch assembly 36 is applied under pressure.

Figure 2:
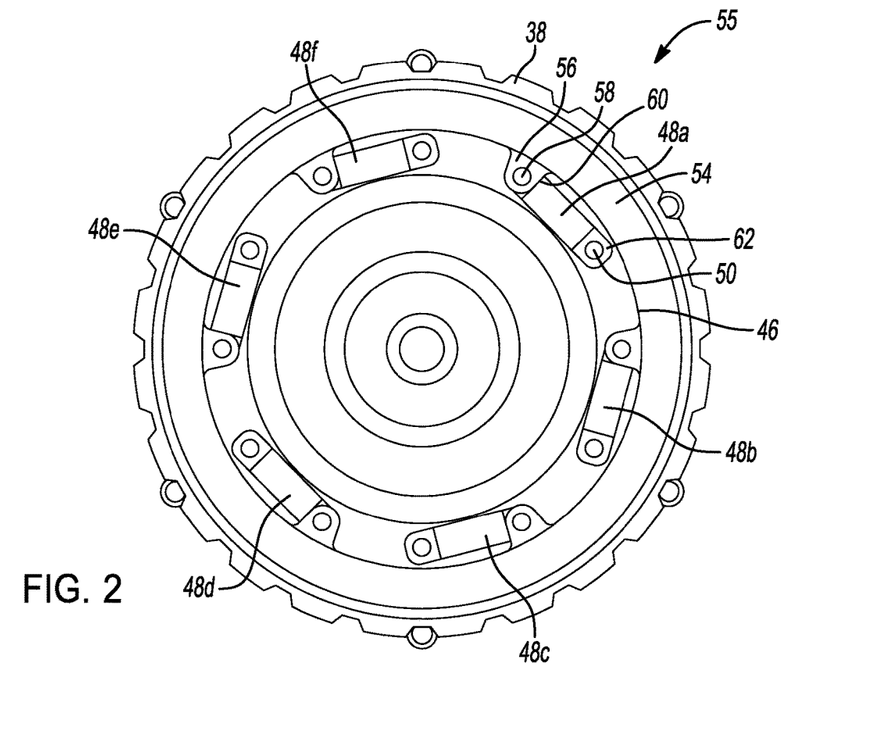
FIG. 2 is an end elevational view of a friction plate assembly having a double sided friction surface and multiple strap springs of the present disclosure.

Referring to FIG. 3 and again to FIGS. 1 through 2, each of the strap springs 48*a*, 48*b*, 48*c*, 48*c*, 48*e*, 48*f* has a stepped shape, stepping from a first end 60 at the connection with the wing extensions 56 toward the single sided friction plate 38 at a second end 62. The stepped shape of the strap springs 48*a*, 48*b*, 48*c*, 48*c*, 48*e*, 48*f* provides several advantages, including allowing for compression and expansion during loading and unloading of hydraulic system pressure to the clutch assembly 36 such that clearance is provided in an unloaded or clutch disengaged condition of the clutch assembly for the various friction surfaces. The stepped shape of the strap springs 48*a*, 48*b*, 48*c*, 48*c*, 48*e*, 48*f* also provides for maximizing a contact surface area of the friction surfaces, as well as providing clearance for inclusion of the reaction plate 42 between the first friction surface 40 and the second friction surface 52.

Figure 3:
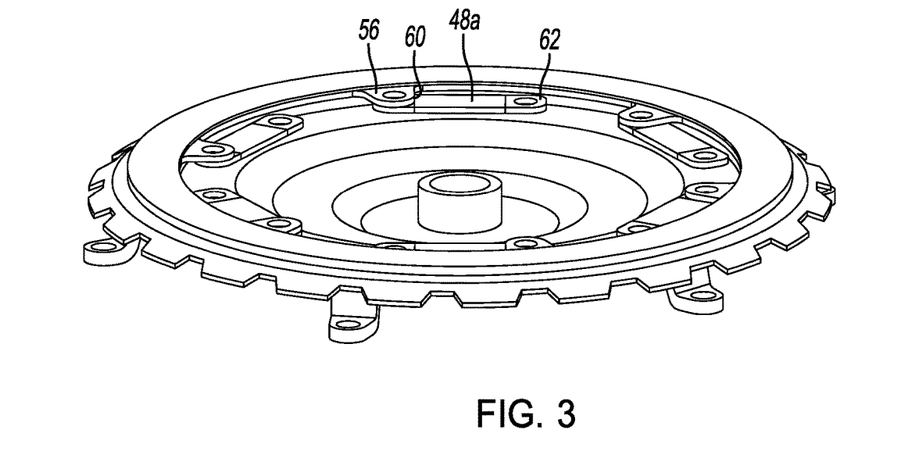
FIG. 3 is a right side perspective view of the friction plate assembly of FIG. 2.
Figure 4:
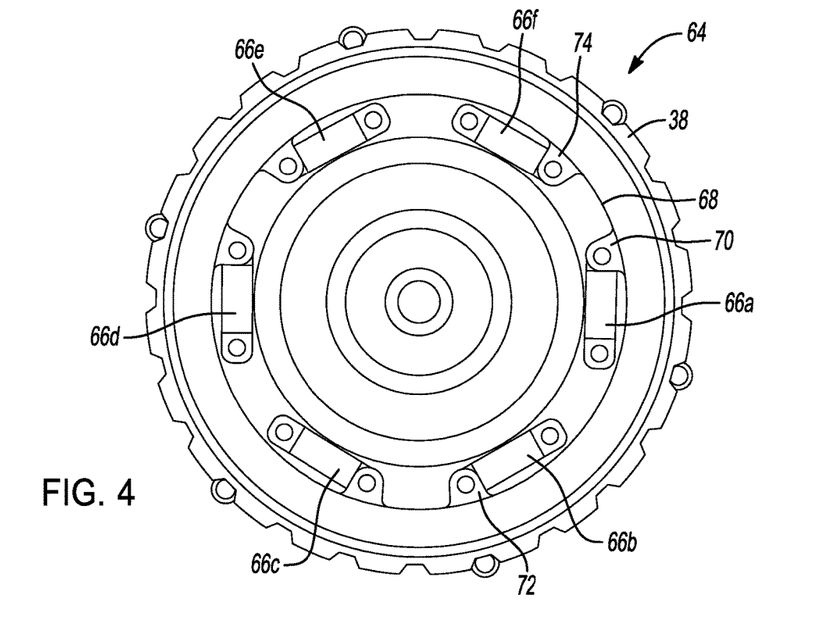
FIG. 4 is an end elevational view of another aspect of a friction plate assembly of the present disclosure.

Referring to FIG. 4 and again to FIGS. 1 through 3, according to further aspects, an assembly 64 of a double sided friction plate 68 to the single sided friction plate 38 is modified from the assembly 55, therefore only the differences will be further discussed herein. The assembly 64 includes multiple strap springs, in this example six strap springs 66*a*, 66*b*, 66*c*, 66*c*, 66*e*, 66*f*. Each of the strap springs 66*a*, 66*b*, 66*c*, 66*c*, 66*e*, 66*f* is oppositely oriented from the direction of the preceding one of the strap springs, such that successive ones of the strap springs 66*a*, 66*b*, 66*c*, 66*c*, 66*e*, 66*f* will be oppositely loaded, either in in tension or in compression when the clutch assembly 36 is applied under pressure. Each of the strap springs 66*a*, 66*b*, 66*c*, 66*c*, 66*e*, 66*f* is individually fastened onto a separate wing extension of the double sided friction plate 68, which are spaced differently from the equal spacing between the wing extensions 56 of the assembly 55. For example a first wing extension 70 connecting the first strap spring 66*a* is spaced further away from a second wing extension 72 connecting the second strap spring 66*b*, than a spacing between the first wing extension 70 and a third wing extension 74 connecting the sixth strap spring 66*f*. This spacing difference is required to achieve the opposite facing direction of successive strap springs of assembly 64.

Figure 5:
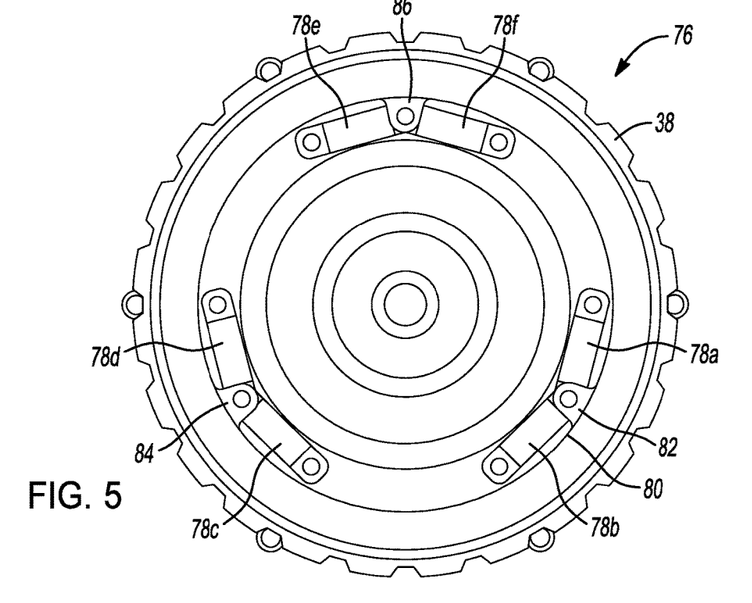
FIG. 5 is an end elevational view of another aspect of a friction plate assembly of the present disclosure.

Referring to FIG. 5 and again to FIGS. 1 through 4, according to further aspects, an assembly 76 of a double sided friction plate 80 to the single sided friction plate 38 is modified from the assemblies 55 and 64, therefore only the differences will be further discussed herein. The assembly 76 includes multiple strap springs, in this example six strap springs 78*a*, 78*b*, 78*c*, 78*c*, 78*e*, 78*f*. The strap springs 78*a*, 78*b*, 78*c*, 78*c*, 78*e*, 78*f* are arranged in pairs, with each pair fastened at a common end to a single wing extension, thereby requiring only three wing extensions including first, second, and third wing extensions 82, 84, 86. The strap springs of each pair, for example the first strap spring 78*a* and the second strap spring 78*b* are oppositely oriented from each other, such that the strap springs of each pair of strap springs will be oppositely loaded, either in in tension or in compression when the clutch assembly 36 is applied under pressure. The first, second, and third wing extensions 82, 84, 86 are equally spaced about an inner perimeter of the double sided friction plate 80 to center the loading from the strap springs.

Figure 6:
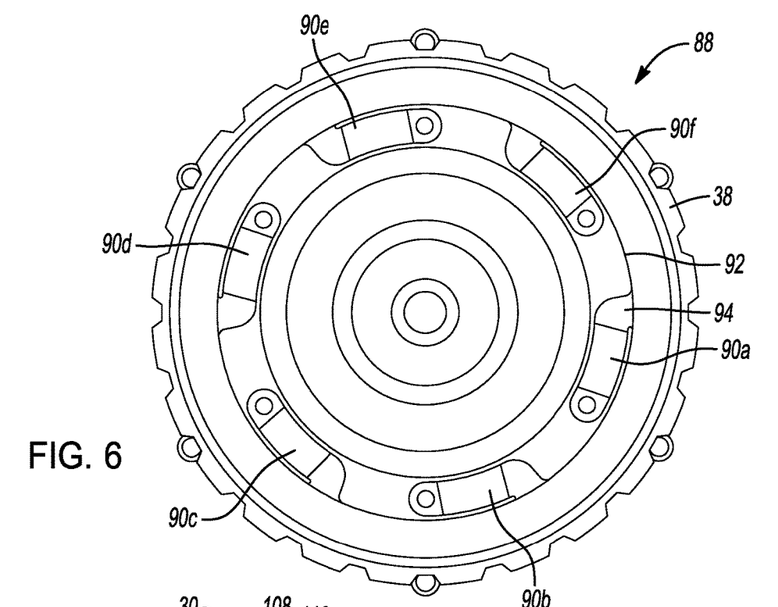
FIG. 6 is an end elevational view of another aspect of a friction plate assembly of the present disclosure.

Referring to FIG. 6 and again to FIGS. 1 through 5, according to further aspects, an assembly 88 of a double sided friction plate 92 to the single sided friction plate 38 is modified from the assemblies 55, 64 and 76, therefore only the differences will be further discussed herein. The assembly 88 includes multiple strap springs, in this example six strap springs 90*a*, 90*b*, 90*c*, 90*c*, 90*e*, 90*f*. In lieu of the strap springs 90*a*, 90*b*, 90*c*, 90*c*, 90*e*, 90*f* being individually fastened to the double sided friction plate 92 each of the 90*a*, 90*b*, 90*c*, 90*c*, 90*e*, 90*f* is integrally connected to the double sided friction plate 92, for example by welding. A connection joint 94 is therefore provided to fix each of the strap springs 90*a*, 90*b*, 90*c*, 90*c*, 90*e*, 90*f* to the double sided friction plate 92. This requires either welding the strap springs to the double sided friction plate 92, or stamping each of the strap springs together with the double sided friction plate 92.

With reference in general to FIGS. 7 through 9 and again to FIG. 1, different geometries of torque converter assemblies and clutch assemblies can be provided using strap spring connected friction plates of the present disclosure.

Figure 7:
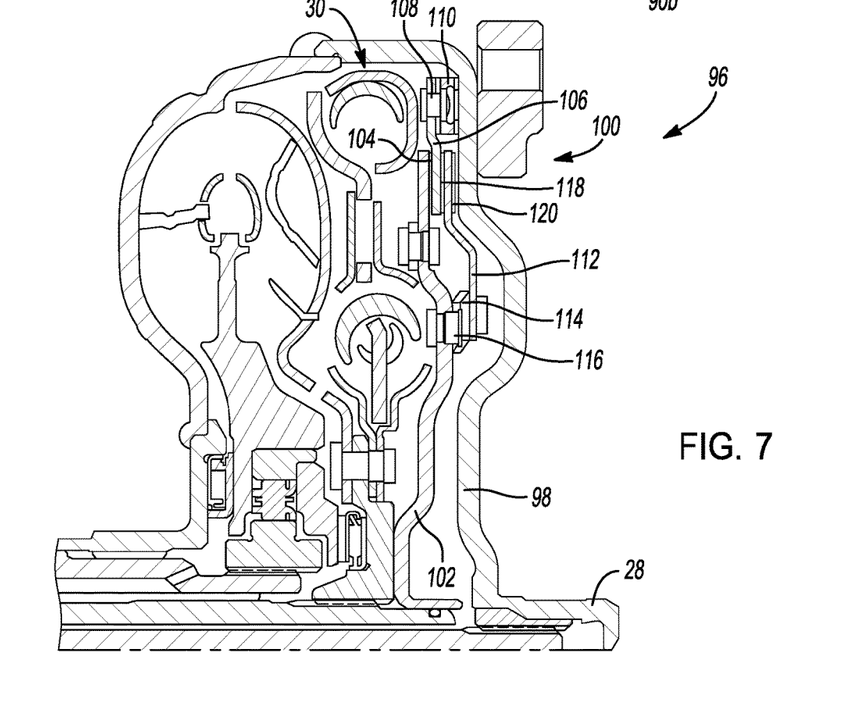
FIG. 7 is a cross sectional side elevational view of another torque transferring transmission drive system modified from FIG. 1.

For example, and referring specifically to FIG. 7, a transmission-drive system 96 for a motor vehicle is modified from the transmission-drive system 10. In order to provide greater clutch torque, a torque converter housing 98 is modified from the torque converter housing 26 to accommodate a clutch assembly 100 positioned radially further away from the transmission input shaft by including a flexible single sided friction plate 102 that is longer than the friction plate 38. The single sided friction plate 102 includes a first friction surface 104 facing a reaction plate 106 which is connected by a fastener 108 and a bracket 110 to the torque converter housing 98. A double sided friction plate 112 is positioned between the reaction plate 106 and the torque converter housing 98. The double sided friction plate 112 is connected using multiple strap springs 114 and multiple fasteners 116. The double sided friction plate 112 includes a second friction surface 118 facing the reaction plate 106, and a third friction surface 120 facing the torque converter housing 98. The position of the clutch assembly 100 being further radially away from the transmission input shaft than the clutch assembly 36 generates greater torque than the clutch assembly 36.

Figure 8:
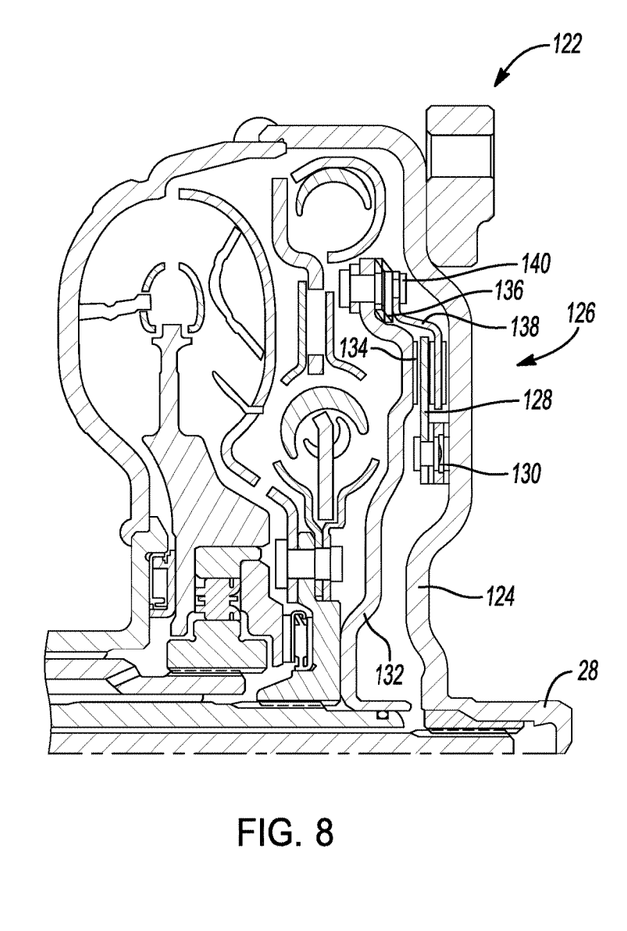
FIG. 8 is a cross sectional side elevational view of another torque transferring transmission drive system modified from FIG. 1.
Figure 9:
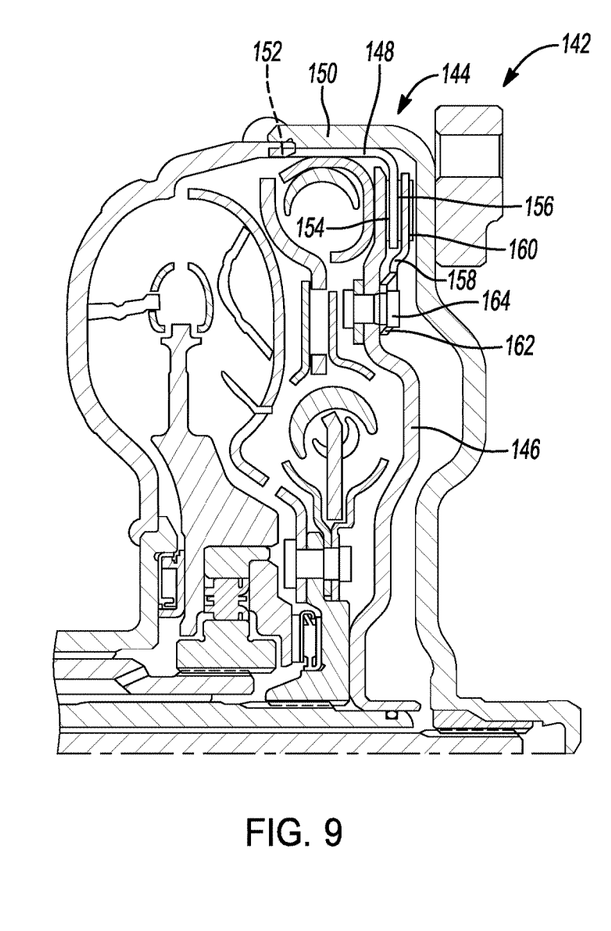
FIG. 9 is a cross sectional side elevational view of another torque transferring transmission drive system modified from FIG. 1.

Referring more specifically to FIG. 8, a transmission-drive system 122 for a motor vehicle is modified from the transmission-drive system 10. In order to provide greater clutch location flexibility, a torque converter housing 124 is modified from the torque converter housing 26 to accommodate a clutch assembly 126 having a reaction plate 128 directly connected to the torque converter housing 124 using a fastener 130. A single sided friction plate 132 includes a first friction surface 134 facing the reaction plate 128. The friction plate 132 is modified to also receive a set of strap springs 136 which are used to support a double sided friction plate 138 such that the friction surfaces of the double sided friction plate 138 are positioned between the reaction plate 128 and the torque converter housing 124. The double sided friction plate 138 is connected using the multiple strap springs 136 and multiple fasteners 140 to the friction plate 132 radially outward of the first friction surface 134.

Referring to FIG. 9 and again to FIG. 8, a transmission-drive system 142 for a motor vehicle is further modified from the transmission-drive system 96 described in reference to FIG. 7 in order to maximize clutch torque. The radial position of a clutch assembly 144 is maximized with respect to the transmission input shaft. The length of a flexible single sided friction plate 146 is maximized. A reaction plate 148 includes a portion abutting an outermost portion of a torque converter housing 150 and is connected by a spline 152 to the torque converter housing 150. A first friction surface 154 on the friction plate 146 faces the reaction plate 148. A second friction surface 156 of a double sided friction plate 158 faces the reaction plate 148, and a third friction surface 160 of the double sided friction plate 158 faces the torque converter housing 150. The double sided friction plate 158 is connected using multiple strap springs 162 and multiple fasteners 164 to the friction plate 146. The position of the clutch assembly 144 being further radially away from the transmission input shaft than the clutch assembly 100 generates greater reaction force and torque than the clutch assembly 100.

Referring to FIG. 10 and again to FIGS. 1 through 8, the geometry of the strap springs such as the strap springs 48 referred to herein provides a stepped design, wherein a substantially planar first surface 166 at the first end 60 is elevated above a substantially planar second surface 168 at the opposite second end 62 when the strap springs 48 are in a non-compressed or clutch disengaged condition. This difference in height "H" provided between the ends of the strap springs 48 is a predetermined value and provides a predetermined clearance between the first friction surface 40 and the reaction plate 42, and equally between the second friction surface 52 the reaction plate 42 in the clutch disengaged condition of the clutch assemblies. According to several aspects and with continued reference to FIG. 10, the predetermined clearance is therefore substantially one half of the height "H". Strap springs of the present disclosure can be made as a single layer of a single material such as a spring steel, or can be made of a lamination of multiple layers of one or more materials. The strap springs can be attached to the friction plates for example using rivets, screws, by welded connections, by bonding, by crimping, or by splines. According to several aspects the strap springs can be attached to the friction plates, or according to further aspects the strap springs can be attached to the reaction plates. The use of strap springs of the present disclosure provides for increased numbers of friction surfaces in a clutch assembly with minimum impact to a length of the torque converter housing and/or a length of the transmission.

Figure 10:
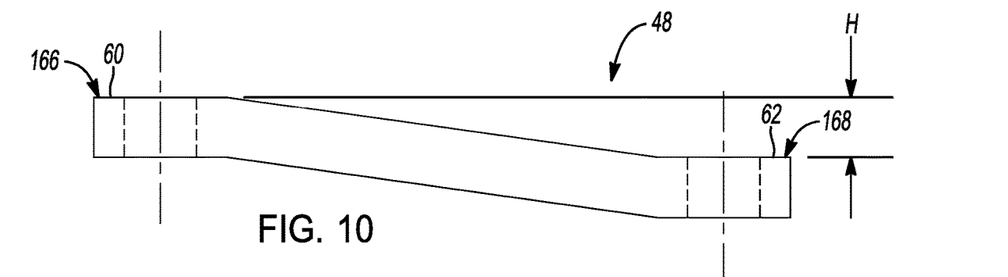
FIG. 10 is a side elevational view of a strap spring of the present disclosure in non-compressed stepped configuration.
Figure 11:
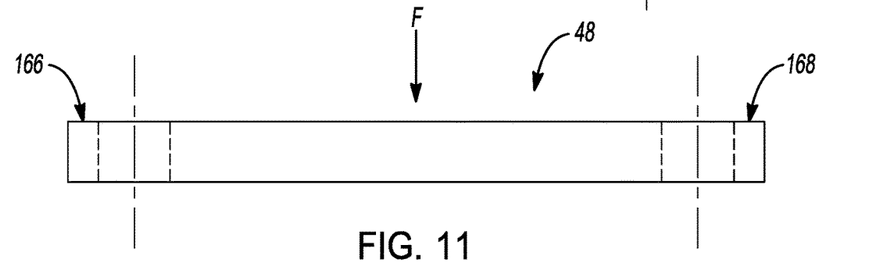
FIG. 11 is a side elevational view of a strap spring of FIG. 10 in a compressed condition.

Referring to FIG. 11 and again to FIGS. 1 through 10, when a force "F" is applied to the strap springs, such as to the strap spring 48, the strap spring 48 compresses against a biasing force acting opposite to the force "F", such that the first surface 166 is brought substantially co-planar with the second surface 168. Hydraulic pressure is applied to the clutch assemblies as described herein, such as application of hydraulic pressure to the first or single sided friction plate 38. The single sided friction plate 38 therefore acts as piston against both the reaction plate 42 and the second or double sided friction plate 46 and elastically compresses the strap springs 48. Elastic compression of the strap springs 48 results in substantial alignment of the planar first surface 166 with the planar second surface 168 until hydraulic clutch pressure is reduced. When hydraulic pressure acting on the single sided friction plate 38 is reduced, defining the clutch disengaged condition, the biasing force of the strap springs 48 returns the stepped geometry of the strap springs 48 as shown in FIG. 10. The difference in height "H" shown and described in reference to FIG. 10 is reestablished and the clearance between the friction surfaces and the reaction plate is returned.

It is noted that the quantity of six strap springs identified in the clutch assemblies discussed herein is not limiting, and the quantity of six can vary, including having a minimum of three strap springs, and having a quantity greater than three strap springs within the scope of the present disclosure.

Figure 12:
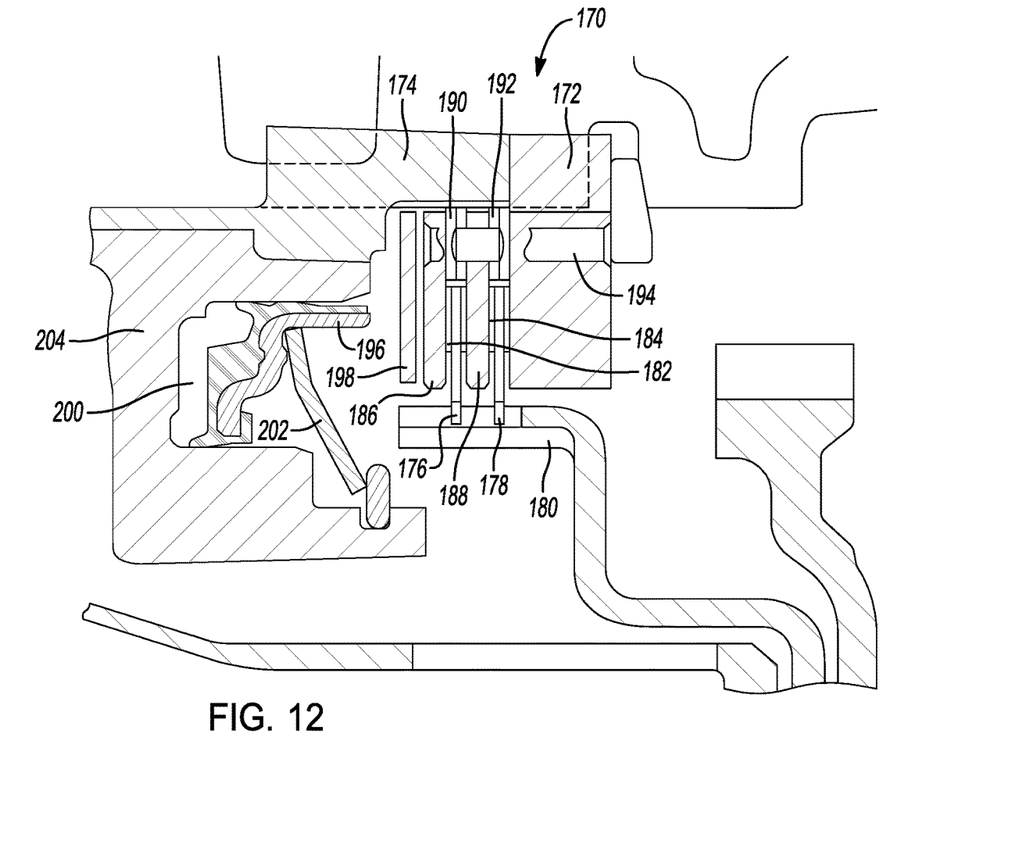
FIG. 12 is a cross sectional side elevational view of a clutch assembly having multiple strap springs of the present disclosure.

Referring to FIG. 12, the strap spring design of the present disclosure can also be used in multiple different applications, including in transmission gear shift clutch and brake designs. In an exemplary clutch assembly 170 a backing plate 172 is splined to a transmission housing 174 of a transmission. A first friction plate 176 and a second friction plate 178 are individually splined to a hub 180. The hub 180 is connected to a transmission member (not shown) which can include a member of a planetary gear set or a transmission shaft. Each of the first friction plate 176 and the second friction plate 178 includes at least one friction surface, such as a first friction surface 182 and a second friction surface 184. A first reaction plate 186 is positioned to be frictionally engaged by the first friction surface 182 and a second reaction plate 188 is positioned between the first friction plate 176 and the second friction plate 178 and is frictionally engaged by at least the second friction surface 184. In lieu of connecting the first and the second reaction plates 186, 188 to the housing member 174 as is known, the first and the second reaction plates 186, 188 are separated by a first strap spring 190, and a second strap spring 192 separates the second reaction plate 186 from the backing plate 172. In lieu of splines, the first and second reaction plates 186, 188, the first strap spring 190, and the second strap spring 192 are connected to each other using fasteners positioned at regular angular intervals about the diameter of the assembly, such as a fastener 194. The fasteners 194 can be for example rivets fixed to the backing plate 172.

The biasing force of the first strap spring 190 and the second strap spring 192 normally act to separate the friction surfaces of the first friction plate 176 and the second friction plate 178 from the reaction plates 186, 188 and the backing plate 172 when hydraulic pressure does not act on the clutch assembly 170. Hydraulic pressure is used to actuate the clutch assembly 170 via a piston 196, which acts on a wave plate 198 to displace the first friction plate 176, the second friction plate 178, and the reaction plates 186, 188 together toward the backing plate 172. To engage the clutch assembly 170, pressurized hydraulic fluid is ported into a piston chamber 200 which displaces the piston 196 against the biasing force of a return spring 202. The piston chamber 200 and the piston 196 are located in a housing portion 204 of the transmission housing 174. The piston 196 contacts the wave plate 198 which then causes the first friction plate 176, the second friction plate 178, and the reaction plates 186, 188 to slide together on the fasteners 194 toward the backing plate 172.

Because the first and the second reaction plates 186, 188 are not fixed to the transmission housing 174, the biasing force of the first strap spring 190 and the second strap spring 192 therefore allow the first and the second reaction plates 186, 188 to move more freely with respect to each other and therefore greater clearance is provided between the friction surfaces of the first friction plate 176 and the second friction plate 178 and the first and the second reaction plates 186, 188 when the clutch assembly 170 is not pressurized. This reduces friction wear and increases the operational life of the clutch assembly 170.

According to several aspects of the present disclosure, a torque transferring transmission-drive system 10 includes a first friction plate 38, 102, 132, 146, 176 having a first friction surface 40, 104, 134, 154, 182. A second friction plate 46, 68, 80, 92, 112, 138, 148, 178 has a second friction surface 52, 118, 156, 184 directed toward the first friction surface 40, 104, 134, 154, 182. A reaction plate 42, 106, 128, 148, 188 is positioned between the first friction surface 40, 104, 134, 154, 182 and the second friction surface 52, 118, 156, 184. A piston 38, 132, 196 is actuated by a fluid pressure to displace the first friction surface 40, 104, 134, 154, 182 toward the second friction surface 52, 118, 156, 184, frictionally engaging the reaction plate 42, 106, 128, 148, 188 between the first friction surface and the second friction surface. Multiple strap springs 48, 66, 78, 90, 114, 136, 162, 190, 192 are each connected either to both of the first and the second friction plates or to the reaction plate. In a clutch engaged condition the multiple strap springs 48, 66, 78, 90, 114, 136, 162, 190, 192 elastically compress allowing the reaction plate 42, 106, 128, 148, 188 to be frictionally engaged between the first friction surface 40, 104, 134, 154, 182 and the second friction surface 52, 118, 156, 184, and in a clutch disengaged condition the multiple strap springs 48, 66, 78, 90, 114, 136, 162, 190, 192 elastically expand creating a clearance between the reaction plate 42, 106, 128, 148, 188 and each of the first friction surface 40, 104, 134, 154, 182 and the second friction surface 52, 118, 156, 184.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque transferring transmission-drive system, comprising:
   a first friction plate having a first friction surface;
   a second friction plate having a second friction surface directed toward the first friction surface;
   a reaction plate positioned between the first friction surface and the second friction surface;
   a piston configured to displace the first friction surface toward the second friction surface; and
   at least one strap spring connected at a first end to the second friction plate and connected at a second end to the first friction plate such that the at least one strap spring joins the first friction plate to the second friction plate, wherein the at least one strap spring in a clutch engaged condition elastically compresses allowing the reaction plate to be frictionally engaged between the first friction surface and the second friction surface, and in a clutch disengaged condition the at least one strap spring elastically expands creating a clearance between the reaction plate and each of the first friction surface and the second friction surface.

2. The system of claim 1, wherein the second friction plate defines a double sided friction plate including a third friction surface directed oppositely with respect to the second friction surface.

3. The system of claim 1, wherein the third friction surface faces a transmission housing and contacts the transmission housing in the clutch engaged condition.

4. The system of claim 3, further including at least one fastener connecting the reaction plate to the transmission housing.

5. The system of claim 1, wherein the multiple strap springs are each connected at the first end to the second friction plate using fasteners.

6. The system of claim 1, wherein the strap springs are each connected at the first end to the second friction plate by a weld joint.

7. The system of claim 1, wherein the strap springs are each integrally connected at the first end to the second friction plate such that the strap springs define integral extensions of the second friction plate.

8. The system of claim 1, wherein in the clutch disengaged condition the strap springs include a stepped shape, stepping from the first end to the second end.

9. The system of claim 8, wherein the stepped shape includes a substantially planar first surface at the first end which is elevated above a substantially planar second surface at the opposite second end when the strap springs are uncompressed in the clutch disengaged condition.

10. The system of claim 9, wherein a difference in a height "H" between the first end and the second end is a predetermined value, and wherein the difference in the height "H" creates a predetermined clearance between the first friction surface, the second friction surface, and the reaction plate in the clutch disengaged condition.

11. The system of claim 1, wherein the at least one strap spring is connected to the reaction plate by at least one fastener.

12. The system of claim 11, wherein the at least one strap spring and the at least one fastener are coupled to a fixed backing plate such that the at least one strap spring and the reaction plate are displaceable toward or away from the backing plate.

13. A torque transferring transmission-drive system, comprising:
    a first friction surface;
    a second friction surface directed toward the first friction surface;
    a reaction plate positioned between the first friction surface and the second friction surface;
    a piston actuated by a fluid pressure to displace the first friction surface toward the second friction surface, frictionally engaging the reaction plate between the first friction surface and the second friction surface; and
    at least one strap spring connected by a fastener to the reaction plate, the at least one strap spring in a clutch engaged condition elastically compressing to allow the reaction plate to be frictionally engaged between the first friction surface and the second friction surface, and in a clutch disengaged condition the at least one strap spring elastically expanding to create a clearance between the reaction plate and each of the first friction surface and the second friction surface.

14. The system of claim 13, further including a first friction plate having the first friction surface fixed thereto, wherein the first friction plate defines the piston.

15. The system of claim 13, further including:
    a first friction plate having the first friction surface fixed thereto; and
    a second friction plate having the second friction surface fixed thereto.

16. The system of claim 15, wherein the at least one strap spring is connected by at least one fastener to both the first friction plate and the second friction plate.

17. The system of claim 13, further including:
    a backing plate fixed to structure of a transmission; and
    a wave plate positioned between the piston and the reaction plate and acting when contacted by the piston to displace the first friction surface, the reaction plate, and the second friction surface together toward the backing plate.

18. A torque transferring transmission-drive system, comprising:
    a first friction plate having a first friction surface;
    a second friction plate having a second friction surface directed toward the first friction surface;
    a reaction plate positioned between the first friction surface and the second friction surface;
    a piston actuated by a fluid pressure to displace the first friction surface toward the second friction surface, frictionally engaging the reaction plate between the first friction surface and the second friction surface; and multiple strap springs each connected either to both of the first and the second friction plates or to the reaction plate;

wherein in a clutch engaged condition the multiple strap springs elastically compress allowing the reaction plate to be frictionally engaged between the first friction surface and the second friction surface, and in a clutch disengaged condition the multiple strap springs elastically expand creating a clearance between the reaction plate and each of the first friction surface and the second friction surface.

* * * * *